(12) United States Patent
Neufeld et al.

(10) Patent No.: US 6,442,631 B1
(45) Date of Patent: Aug. 27, 2002

(54) ALLOCATING SYSTEM RESOURCES BASED UPON PRIORITY

(75) Inventors: E. David Neufeld, Tomball; Christopher J. Frantz, Houston, both of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/306,878

(22) Filed: May 7, 1999

(51) Int. Cl.⁷ .............................................. G06F 13/00
(52) U.S. Cl. ........................ 710/107; 710/40; 710/264
(58) Field of Search ................................ 710/107, 111, 710/113, 114, 116, 119, 264, 121, 122, 123, 265, 40

(56) References Cited

U.S. PATENT DOCUMENTS

| | | | |
|---|---|---|---|
| 4,438,489 A | | 3/1984 | Heinrich et al. ............. 364/200 |
| 4,794,526 A | | 12/1988 | May et al. ................... 364/200 |
| 4,965,716 A | * | 10/1990 | Sweeney ..................... 710/112 |
| 5,133,062 A | * | 7/1992 | Joshi et al. |
| 5,193,196 A | * | 3/1993 | Mochida et al. ............. 710/241 |
| 5,247,675 A | * | 9/1993 | Farrell et al. ................ 709/103 |
| 5,301,279 A | * | 4/1994 | Riley et al. ................... 710/41 |
| 5,379,428 A | * | 1/1995 | Belo ........................... 709/103 |
| 5,392,436 A | | 2/1995 | Jansen et al. ................ 395/725 |
| 5,450,570 A | | 9/1995 | Richek et al. ............... 395/500 |
| 5,452,452 A | * | 9/1995 | Gaetner et al. ............. 709/103 |
| 5,504,894 A | * | 4/1996 | Ferguson et al. .............. 707/2 |
| 5,553,248 A | | 9/1996 | Melo et al. .................. 395/296 |
| 5,701,480 A | * | 12/1997 | Raz ............................. 709/101 |
| 5,822,584 A | | 10/1998 | Thompson et al. ......... 395/673 |

OTHER PUBLICATIONS

*MultiProcessor Specification Ver. 1.4*, Intel Corporation, May 1997, pp. 3–5 through 3–16 and pp. D–1 through D–3.
*Advanced Configuration and Power Interface Specification*, Intel Corporation, Microsoft Corporation, Toshiba Corporation, © 1996, pp. 2–10, 5–76 through 5–80, 5–88 through 5–90, 9–162 and 14–204 through 14–205.

\* cited by examiner

*Primary Examiner*—Xuan M. Thai
(74) *Attorney, Agent, or Firm*—Akin, Gump, Strauss, Hauer & Feld, LLP

(57) ABSTRACT

A computer system is implemented according to the invention when priority information is included with a bus transaction. Instead of processing bus transactions on a first-come-first-served basis, a computer peripheral device can make decisions about the relative importance of a transaction and process the most important ones first. The priority scheme can be based upon the priority of the process that generates the transaction or on any other scheme. Included in the invention is logic to ensure that transactions of low relative priority do not get completely ignored during periods of high activity.

32 Claims, 4 Drawing Sheets

ALLOCATING SYSTEM RESOURCES BASED UPON PRIORITY

BACKGROUND OF THE INVENTION

1. Field of the Invention

The present invention relates generally to controlling access to computer peripheral devices based upon a priority code, and more particularly, to the arbitration of requests for resources among multiple processes, processors, and peripheral devices.

2. Description of the Related Art

With the ever-increasing amount of data being processed by today's computer systems, the efficient use of computer resources is very important. The processing power of computer systems is often increased by adding processors and allowing multiple processes to run on each processor. In addition, most computers include specialized circuitry, provided via expansion boards that plug into the computer's expansion slots. Typically, these slots are supported by a standardized input/output (I/O) bus such as the Industry Standard Architecture (ISA) bus, the Extended Industry Standard Architecture (EISA) bus, and the Peripheral Component Interconnect (PCI) bus.

In current operating systems (OSs) that run multiple tasks concurrently, central processing units (CPUs) typically schedule a task based upon priority; higher priory tasks are allowed to run first and use a larger slice of the CPU's time. In single and multi-processor systems, the allocation of shared resources like buses, expansion boards and other devices is commonly on a first-come-first-served basis. Solutions for the resource allocation problem have either not used a priority based approach or have focused on the arbitration of multiple resource requests at the I/O bus level.

Today's Symmetric MultiProcessing (SMP) computer systems have begun to address the fact that different processors have multiple processes of different priority running on them. The Advanced Programmable Interrupt Controller (APIC) interrupt delivery system by Intel Corporation, Santa Clara, Calif., is capable of routing the system's interrupts to the processor with the lowest priority process running, allowing a processor with a higher priority process to continue working undisturbed.

For several decades, the Unix operating system (Unix), originally developed by AT&T, has used process priority to determine access to a computer's CPU. Another example of priority based resource allocation is Simple Network Management Protocol (SNMP), found in several OSs, like Unix, MSDOS by Microsoft Corporation, Redmond, Wash., and VMS by Digital Equipment Corporation, Maynard, Mass. SNMP utilizes high priority, or out-of-band, messages to carry control and performance information, enabling network administrators to perform administrative duties and take corrective action when a network is overloaded or deadlocked.

SUMMARY OF THE INVENTION

In a system implemented according to the invention, a bus master, such as a processor, initiates transactions on a bus and provides associated priority information for that transaction. A bus device, such as a memory controller, then receives and processes that transaction, and further receives and retains the priority information. Using this priority information, the bus device can alter the order in which it initiates or processes the transactions. For example, if the bus master assigns priority based on corresponding operating system task priority, transactions associated with low priority tasks may be deferred in favor of transactions initiated by high priority tasks.

According to one embodiment, a bus device has a transaction queue which stores the transaction request and includes storage for a priority level assigned by the process generating the transaction. This priority value could either be the same as the process priority that generates the request or selected using another scheme. A transaction and its priority level are delivered to the queue by a transaction decoder connected either to a multiplexed data bus or separate transaction and priority data buses. The transaction decoder has logic that inserts a new transaction and its priority into the queue ahead of lower priority transactions. The transaction queue has logic to ensure that the highest priority transaction is issued first. If two transactions have equal priorities, the transaction that has been in the queue longest would take precedence. Furthermore, the transaction queue has logic to periodically adjust the priority of already stored transactions to prevent transactions of low priority from being excluded completely from transaction processing during periods of high activity. There is also logic to enable a process to delete an already stored transaction and to upgrade the priority of an already stored transaction. In addition, the transaction queue has logic to resort the queue, if necessary, after an insertion or deletion of a transaction entry or the upgrade or adjustment of the priority of an already stored transaction entry.

BRIEF DESCRIPTION OF THE DRAWINGS

A better understanding of the present invention can be obtained when the following detailed description of the preferred embodiment is considered in conjunction with the following drawings. While the drawings are illustrative of one embodiment, the techniques according to the invention can be implemented in a wide variety of systems.

DETAILED DESCRIPTION OF THE PREFERRED EMBODIMENT

Figure 1:
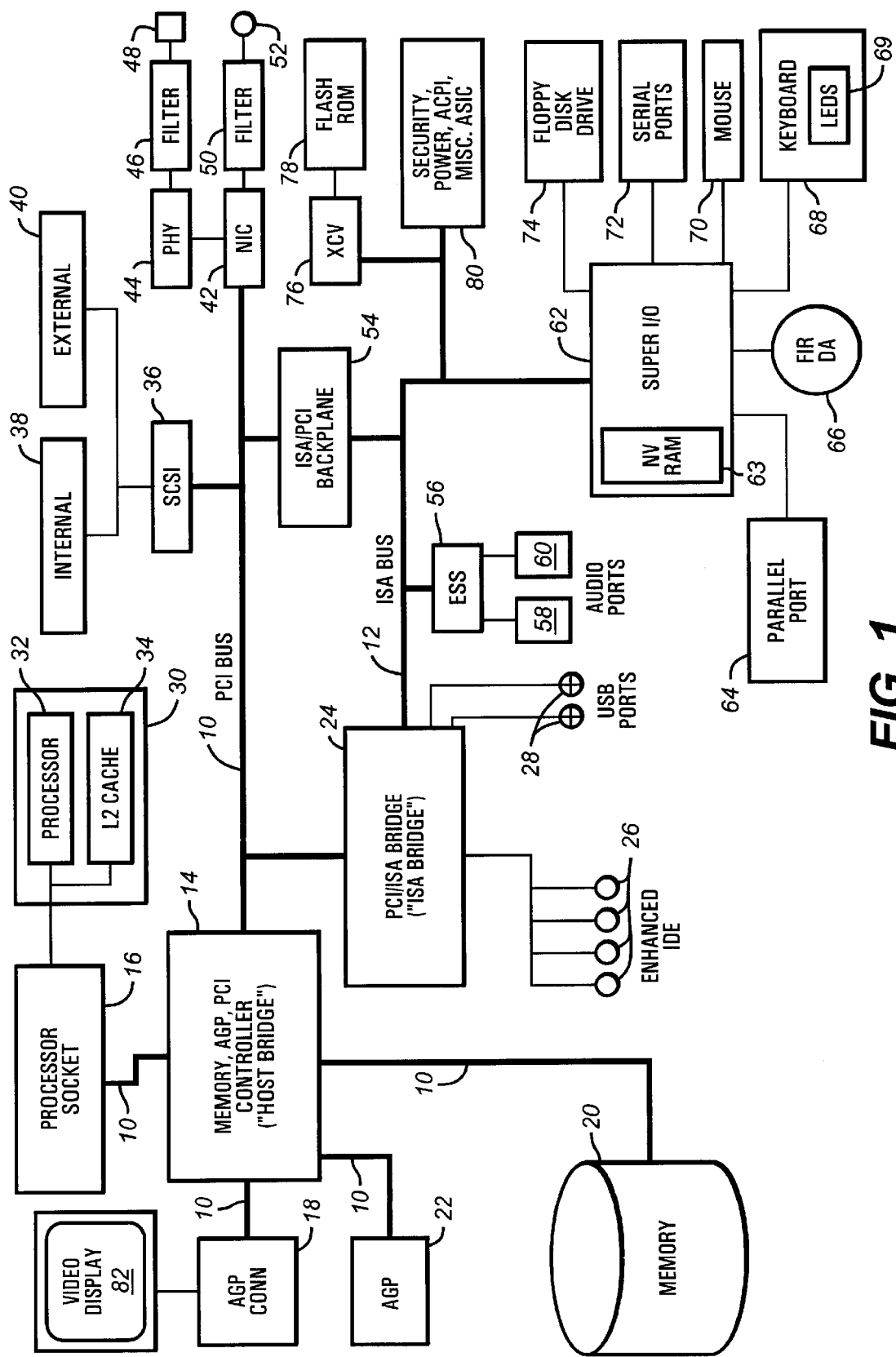
FIG. 1 is a block diagram of a computer system showing peripheral devices and data/address buses.

Turning to FIG. 1, illustrated is a typical computer system S in which the techniques according to the invention can be implemented. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 in the disclosed embodiment is a modified version of a 440LX Integrated Circuit by Intel Corporation, also known as the PCI AGP Controller (PAC). The ISA bridge 24 is a modified version of a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30 that has been modified to support the additional information of the process priority with the requested bus cycles. The processor module 30 includes a microprocessor core 32 and a level two (L2) cache 34. The processor socket 16 could be replaced with different families of processors other than the Pentium II without detracting from the spirit of the invention.

The host bridge 14, when the Intel 440LX Host Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and non-integral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a direct memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the interintegrated circuit ($I^2C$) protocol.

The PCI bus 10 couples a variety of devices that generally take advantage of a high speed data path. This includes a small computer system interface (SCSI) controller 36, with both an internal port 38 and an external port 40. In the disclosed embodiment, the SCSI controller 36 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. The Super I/O 62 contains several logical devices, one of which is a Real Time Clock (RTC). Resident in the RTC of the Super I/O chip 62 is non-volatile Random Access Memory (NV RAM) 63. This Super I/O chip 62 provides a variety of input/output functionality, including a parallel port 64, an infrared port 66, a keyboard controller for a keyboard 68, a mouse port for a mouse 70, additional series ports 72, and a floppy disk drive controller for a floppy disk drive 74. These devices are coupled through connectors to the Super I/O 62. Resident on the keyboard 68 are light emitting diodes (LEDs) 69. The floppy disk drive 74 includes disk drives for a 3½" and 5¼" floppy disks and Advanced Technology Attachment Packet Interface (ATAPI) drives, including the LS-120 drives.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic.

Finally, a video display 82 can be coupled to the AGP connector 18 for display of data by the computer system S.

The computer system S illustrates only one platform in which the system according to the present invention can be implemented. The disclosed techniques can, without distracting from the spirit of the invention, be implemented in any device that passes transactions between components, regardless of whether the device contains less, additional, or different components than the system in FIG. 1.

Figure 2:
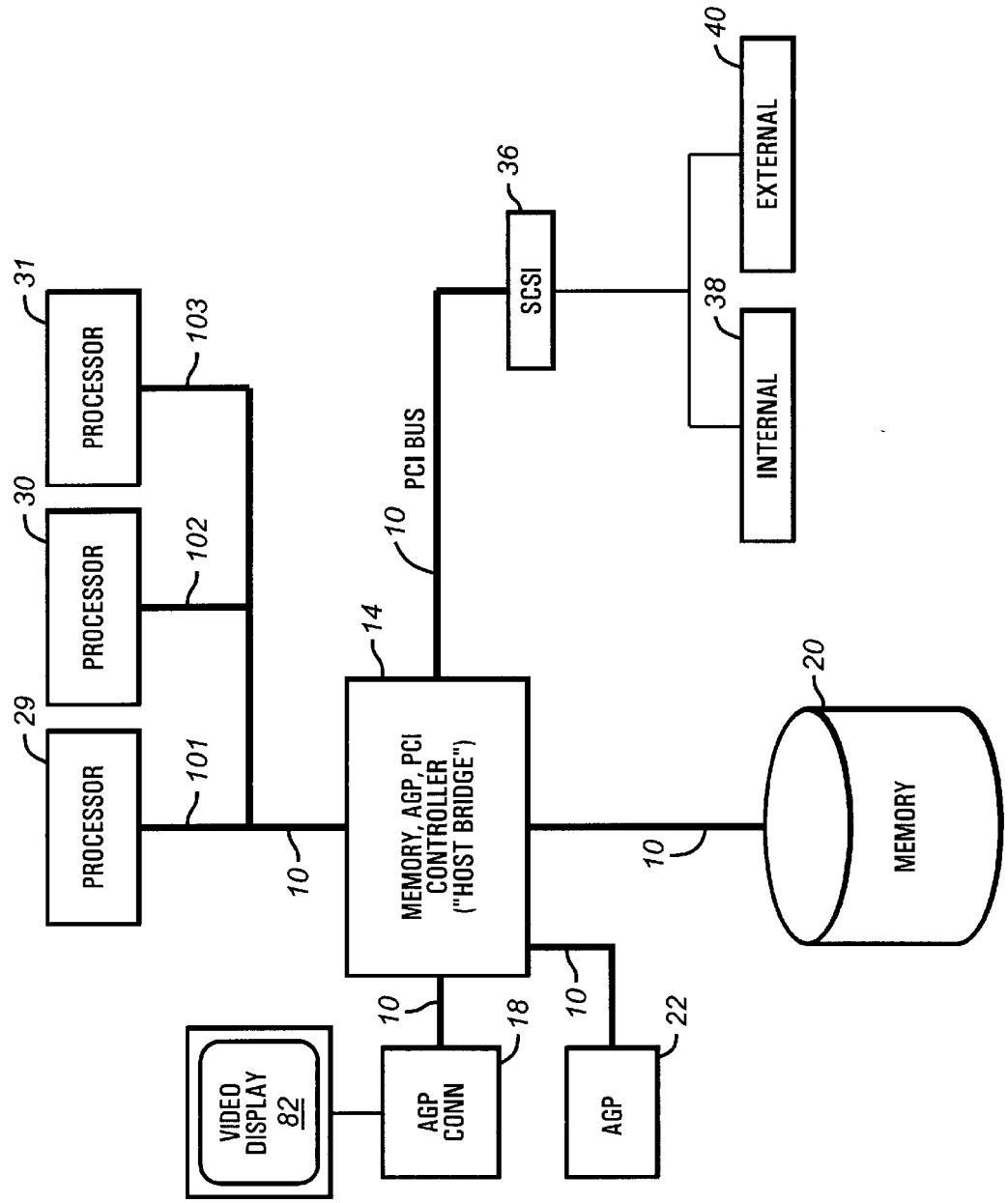
FIG. 2 is a portion of FIG. 1 showing the computer system with multiple processors and shared resources.

Turning to FIG. 2, illustrated is a portion of the computer system shown in FIG. 1 but which contains multiple processors 29, 30, and 31. For simplicity, each processor, 29, 30, and 31, represents a processor socket, like the processor socket 16 in FIG. 1, a microprocessor core, like the microprocessor core 32 in FIG. 1, and an L2 cache, like the L2 cache 34 in FIG. 1. The processors 29, 30, and 31 are each connected to their own host buses 101, 102, and 103 respectively, which in turn connect to the PCI bus 10. The SCSI controller 36, internal port 38, external port 40, memory subsystem 20, AGP 22, and AGP connection 18 are all connected just as they are in FIG. 1.

Figure 3:
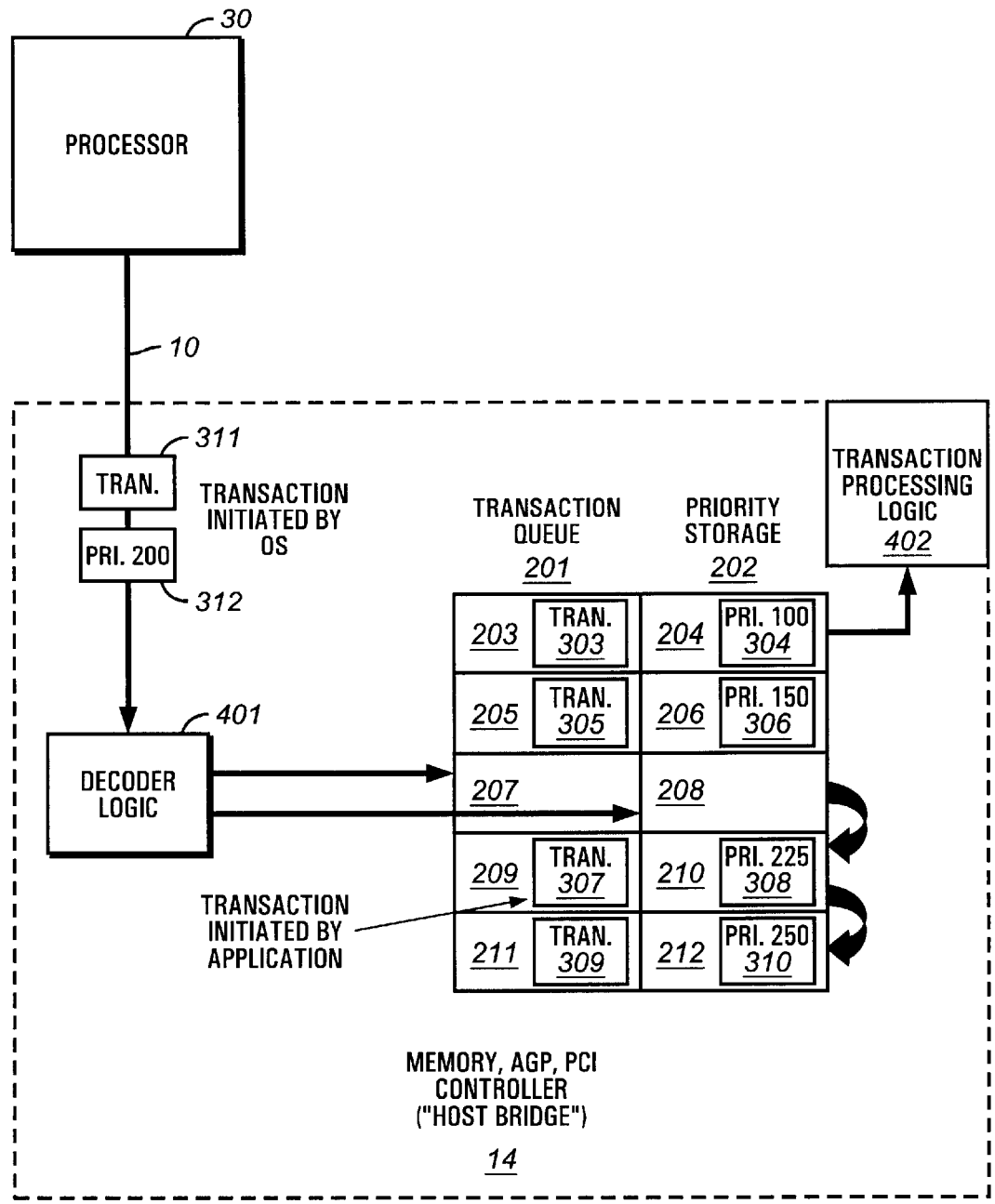
FIG. 3 is a diagram of a transaction queue showing a mid-level priority transaction being inserted into the queue ahead of lower priority transactions and behind higher priority transactions.

Turning to FIG. 3, according to the invention, the processor 30 initiates a bus transaction 311 on the PCI bus 10 and further assigns an associated priority 312 with a priority value of 200 to it. In this example, and as is common in multi-process systems like Unix, a priority value of lower numeric value has a higher relative priority than a priority of higher numeric value. In other words, the transaction with the lowest priority value is processed first. The processor 30 may be running two tasks—for example, an OS task and an application. While waiting for a bus transaction 307, initiated by an application, the processor runs the OS task, generating a bus transaction 311 which is assigned a relative priority 312 of value 200 which is a higher priority than the application bus transaction's 307 priority 308 of value 225. Decoder logic 401 within the bus device, such as the memory controller 14, schedules the transaction 311 by inserting it into the transaction queue 201. To make room for the transaction 311 in the transaction queue 201, already stored transactions 307 and 309 and their associated priorities 308 and 310 are rescheduled. An already stored transaction 309 and its associated priority 310, with a priority value of 250, are moved to transaction queue location 211 and priority storage location 212 respectively to create space in the transaction queue 201 at location 209 and in the priority storage 202 at location 210. An already stored transaction 307 and its corresponding priority 308, with a priority value of 225, are moved to locations 209 and 210 respectively to create a space in the queue for the received bus transaction 311 and its corresponding priority 312, with a priority value of 200. The received bus transaction 311 and its corresponding priority 312 are then inserted into the transaction queue 201 and the priority storage 202 at locations 207 and 208 respectively.

The transaction queue 201 is now ordered with high priority transactions 303 and 305, with their associated priorities 304 and 306 of numeric values 100 and 150 respectively, first and second in line to be sent to the transaction processing logic 401. The OS bus transaction 311 and its associated priority 312 of numeric value 200 is next in line to be processed. The application bus transaction 311 is followed by a lower priority transaction 307 with its corresponding priority 308 of numeric value 225 and transaction 309 with its corresponding priority 310 of numeric value 250. In this example, transactions 303 and 305 may have been generated by real-time applications or real time events, for example, and may have a higher priority than the OS transaction 311. More specifically, data received by the NIC 42 may need to be dumped into main memory immediately and might be more important than traffic generated by even a higher priority application. In another scenario, transactions 303 and 305 might have been in the transaction queue 201 long enough that their priorities 304 and 306 had been adjusted upward to prevent the transactions from being preempted for too long during a period of high resource utilization. This avoids what is typically called "starvation" in the industry. The priorities can be adjusted based on either a clock signal or a count of received bus transactions.

This is a logical description of the insertion process; a system according to the invention could instead prioritize the transactions in many different ways. For example, it can insert the transaction entry into any available spot in the queue and then resort the entire queue to maintain the relative ordering without changing the spirit of the invention. It can use pointers to transactions and their associated priorities stored in another storage area so during a sort only the pointers are changed and the transactions and their priorities themselves need not be moved. In addition, another embodiment of the invention can have separate queues for the processing of read transactions and write transactions. It also is not critical how the priority is transmitted in conjunction with the bus transaction. The techniques according to the invention can be implemented in a variety of ways. For example, the embodiment of FIG. 3 illustrates a multiplexing of the priority with the transaction so that they are delivered sequentially over a single bus. In an alternative embodiment, a separate "priority bus," which delivers the priority simultaneously with the transaction, can be used. Further, a "change current priority" command can instead be transmitted to adjust the priority of an already stored transaction. A "delete transaction" command can be transmitted to prevent a transaction that is no longer needed from being processed. Whatever the technique, transmission of priority information, associated with transaction information, allows a device, such as the memory controller 14, to more effectively process transactions. By prioritizing transactions over a bus based on priority information, bandwidth can be more effectively utilized.

Figure 4:
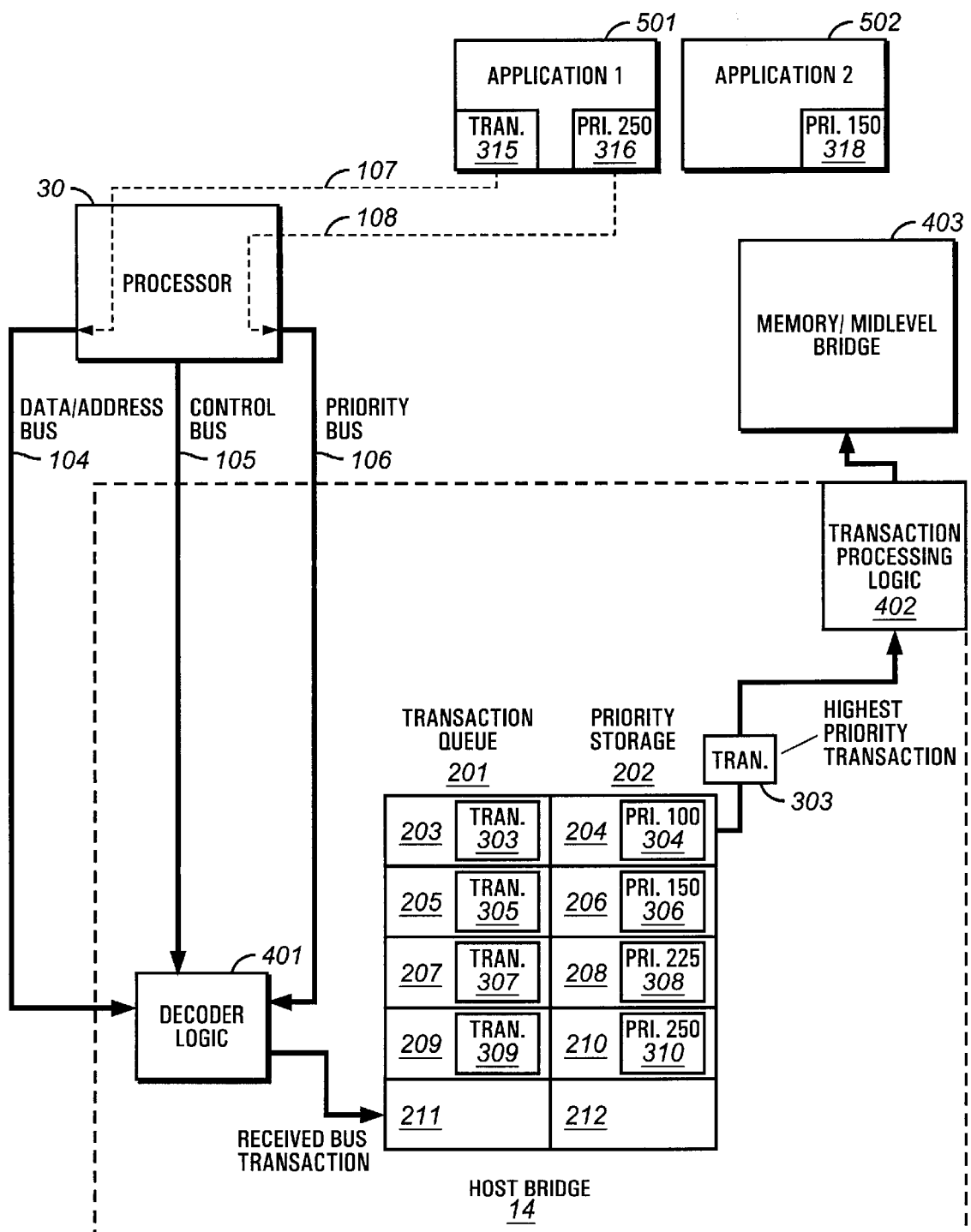
FIG. 4 is a diagram of the transaction queue with central processing unit, data/address, control, and priority buses, decoder logic, and transaction processing logic.

Turning now to FIG. 4, illustrated is the use of a separate data/address bus 104, control bus 105, and priority bus 106. The control bus 105 carries control information, the data/address bus 104 carries transactions, and the priority bus 106 carries priority associated with a transaction. An application 501 and an application 502 are shown with associated process priority 316 of numeric value 250 and process priority 318 of numeric value 150 respectively. The application 501 is illustrated with a transaction 315 ready to be executed. In this example, the processor priority 316 is associated with transaction 315. It is not necessary to assign the priority associated with the generating process to the transaction entry; a priority can be assigned to transactions using any other criteria. For example, the OS or an application might place a higher relative priority on a memory read than on a memory write. In another embodiment in which read and write transactions are placed in different transaction queues, a transaction from the read queue could be processed before a transaction with an equal priority from the write queue. In this figure, the transaction 315 and its associated priority 316 are received simultaneously at the decoder logic 401 within the host bridge 14. In an alternative embodiment, the transaction and its priority can be delivered sequentially over a single multiplexed bus. The decoder logic 401 inserts the transaction 313, once it is received, into the transaction queue at location 211 and inserts the associated priority 314 of the received transaction into the priority storage 202 at location 212. After reaching the top of the transaction queue 201 at location 203, transaction 303 is shown being forwarded to transaction processing logic 402, which in turn sends it to a memory/midlevel bridge 403. It might not be necessary to send the priority of transaction 303 to the memory/midlevel bridge 403 but it can be sent if the memory/midlevel bridge 403 is also prioritizing transactions according to the present invention.

A system implemented according to the present invention enables a computer system to prioritize its resource requests, allowing more important transactions to be processed first. CPUs have become faster and the latency of responses to transactions by peripheral devices has had an increasing impact on overall system throughput. Allowing the CPU to make decisions concerning the scheduling of resource requests allows an increase in the overall throughput of the system. It also enables applications such as a tape backup program enough access to needed resources to keep a tape drive supplied with data so that the tape drive does not "drop out of streaming" mode and have to reposition a tape. Another benefit is that the "feel" of the system S can be better controlled and that various programs that are not high priority will not be competing for system resources that a program which interfaces with a human user may need.

Although the diagrams illustrate an embodiment of the present invention incorporated into a memory controller, it would have as much utility in a PCI or other midlevel bus controller, which handles multiple devices of varying importance and routes transactions to other devices, a Network Interface Card (NIC), which handles local area network (LAN) read/write requests and possibly Internet traffic, a bridge chip, and a variety of other devices that respond to bus transactions. Further, although processors are shown initiating the prioritized transaction, the technique is more broadly applicable in any bus master/bus slave environment.

This system can also be of benefit in servicing interrupts. In general, interrupt service routines need low latency and quick completion. A system implemented according to the present invention may be a potential source of interrupt latency. If a processor running at a low priority level takes an interrupt request, the interrupt request may not be processed as quickly as possible if the processor must compete with other processors running at a higher priority level. If the code for the interrupt handler is not in the processor's cache, the interrupt handler may experience additional latency while competing for memory transactions. A software solution may be to set the processor running the interrupt routine to a high priority during the processing of the interrupt and then restore the processor's priority level at the end of the interrupt processing. However, the processor may still have to compete for memory transactions until it's priority level is set. In the alternative, a hardware solution employ circuitry to set a processor's priority level to a predetermined "interrupt priority level" upon acknowledging the interrupt signal and then restoring the processor's priority level when the processor finishes handling the interrupt request. This scheme guarantees that interrupt handler premium access to system resources, facilitating fast interrupt processing times.

It should be noted that with a processor it is very natural to prioritize different processes and have their corresponding resource usage of the system adjusted according to the method according to the present invention. The method is very valuable in a generalized sense. One example is bus traffic generated by the NIC 42. The NIC 42 may benefit from a knowledge of the relative priorities of various end points to which it is sending information. Traffic to one particular ethernet address may be unimportant from a performance standpoint. In other words, the NIC 42 can wait until nothing is happening on the bus 10 to send information. Another address may be very important from a performance standpoint and need to be prioritized higher than resource usage generated even by the CPUs. In addition, different types of traffic may have different levels of priority. For example, a broadcast message may be deemed a low priority, particularly since broadcast messages are typically sent as "data-grams" and delivery is not even guaranteed. In this example, the end point that generates the traffic is not critical; instead, the type of traffic controls the priority of the requested cycles.

A wide variety of systems could be used instead of the disclosed system S without detracting from the spirit of the invention.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A device for processing bus transactions that have associated priorities within a computer system, the device comprising:

a transaction queue having transaction entries that queue for later processing;

priority storage containing priority entries that correspond to the transaction entries, each priority entry associating a relative priority to a corresponding transaction entry; and a transaction decoder for receiving the bus transactions and the associated priorities, the transaction decoder storing received bus transactions as transaction entries in the transaction queue and storing received associated priorities corresponding to the received bus transactions as priority entries in the priority storage.

2. The device of claim 1, wherein the device is a memory controller.

3. The device of claim 1, wherein the device is a bridge chip.

4. The device of claim 1, wherein the priority assigned corresponds to a priority assigned by an operating system on the computer system to a process generating the transaction.

5. The device of claim 1, wherein the received bus transaction is a memory operation.

6. The device of claim 1, wherein separate transaction queues and priority storage areas are used for read and write transactions.

7. The device of claim 1, wherein the transaction decoder receives bus transactions and the associated priorities from an interface bus.

8. The device of claim 7, wherein the interface bus employs separate signal lines to receive the associated priority at the same time as the received bus transactions.

9. The claim of claim 7, wherein the interface bus employs multiplexed signal lines to receive the associated priority with the received bus transaction sequentially on the multiplexed signal lines.

10. The device of claim 1, further comprising scheduling logic coupled to the transaction queue for determining the next transaction to process.

11. The device of claim 10, wherein the scheduling logic employs a highest priority first scheme so that the transaction entry having the highest associated priory is processed first.

12. The device of claim 10, wherein the scheduling logic raises over time a transaction entry of lower priority to a higher priority and, if necessary to preserve the relative ordering, resorts the transaction queue.

13. The device of claim 12, wherein the scheduling logic raises a transaction entry of lower priority to a higher priority based upon a timing signal.

14. The device of claim 12, wherein the scheduling logic raises a transaction entry of lower priority to a higher priority based upon a received bus transaction count.

15. The device of claim 10, further comprising merge logic that inserts a received bus transaction into an appropriate place in the transaction queue based upon the priority of the received transaction.

16. The device of claim 10, further comprising merge logic that adjusts the priority of an already stored transaction entry upon receipt of an appropriate signal and, if necessary to preserve the relative ordering, resorts the transaction queue.

17. The device of claim 10, further comprising logic to delete an already stored transaction entry upon receipt of an appropriate signal and, if necessary, to resort the transaction queue.

18. A method for processing bus transactions that have associated priorities within a computer system, the method comprising the steps of:

providing a bus transaction and associated transaction priority from a bus master;

receiving the bus transaction and the associated transaction priority at a bus device;

processing the bus transaction in the bus device in an order based on the associated transaction priority.

19. The method of claim 18, wherein the associated transaction priority assigned corresponds to a priority assigned by an operating system on the computer system to a process generating the transaction.

20. The method of claim 18, wherein the received bus transaction is a memory operation.

21. The method of claim 18, wherein the associated transaction priority is provided over an interface bus that employs separate signal lines to carry the associated transaction priority at the same time as the bus transaction.

22. The method of claim 18, wherein the associated transaction priority is provided over an interface bus that employs multiplexed signal lines to carry the associated transaction priority sequentially with the bus transaction on the multiplexed signal lines.

23. A computer system comprising:
   a bus master producing a bus transaction and associated priority information;
   a bus connected to the processor for carrying the bus transaction and the associated priority information;
   a mass storage subsystem; and
   a device coupled to the bus and responsive to the bus transaction and the associated priority information, the device processing the bus transaction in an order based on the priority information associated with the bus transaction.

24. The computer system of claim 23, wherein the device is a memory controller.

25. The computer system of claim 23, wherein the device is a bridge chip.

26. The computer system of claim 23, wherein the bus master is a processor.

27. The computer system of claim 26, wherein the priority assigned corresponds to the priority assigned by an operating system on the computer system to a process generating the transaction.

28. The computer system of claim 23, wherein the bus transaction is a memory operation.

29. The computer system of claim 23 wherein the bus employs separate lines to carry the priority information at the same time as the bus transaction.

30. The computer system of claim 23 wherein the bus employs multiplexed lines to carry the priority information sequentially with the bus transaction.

31. The computer system of claim 23, wherein the priority information is associated with a plurality of us transactions.

32. The computer system of claim 31, wherein the priority information is associated with subsequent bus transactions until new priority information is provided.

* * * * *